Patented Dec. 5, 1933

1,937,963

UNITED STATES PATENT OFFICE 1,937,963

PRODUCTION OF ARALKYLARYL CARBOXYLIC ACID

Alphons O. Jaeger, Mount Lebanon, and Lloyd C. Daniels, Crafton, Pa., assignors to The Selden Company, Pittsburgh, Pa., a corporation of Delaware No Drawing. Application February 27, 1931
Serial No. 518,902

19 Claims. (Cl. 260—64)

This invention is directed to the production of aralkylaryl carboxylic acids in which the aralkyl group contains more than one nucleus, and more particularly to the production of polynuclear aralkylaryl carboxylic acids having a molecular weight greater than 263.

According to the present invention, polynuclear aryl compounds having a molecular weight greater than 128 are caused to react with phthalide or with homologues or substitution products of phthalide in the presence of aluminum chloride usually under the conditions of the ordinary Friedel-Crafts reaction used with phthalic anhydride to produce keto aromatic acids.

The aralkylaryl carboxylic acids have important uses as dye intermediates and for the production of esters to be used as plasticizers. These acids owe their particular usefulness in the production of dyes to the fact that they can be caused to ring close, forming leuco compounds of the anthrone type with greater ease than in the case of the corresponding keto acids. In fact, some keto acids are almost impossible to ring close, whereas the corresponding aralkylaryl carboxylic acid ring closes with relative ease. Isolated members of the series have been produced for the most part by reduction of the corresponding keto acids and thus adding an additional process step and making the resulting product more expensive.

According to the present invention the aralkylaryl carboxylic acids are produced directly by reaction with phthalide, eliminating any reduction step of the finished product, and actually giving in most cases better yields than are obtainable with phthalic anhydride itself. The products obtained by the novel process of the present invention are for the most part new, although, as has been pointed out above, isolated members have been produced by the reduction of the corresponding keto acids. In general, the present invention can be carried out under the ordinary conditions of the Friedel-Crafts syntheses with phthalic anhydride, but, as is usually the case in Friedel-Crafts reactions, the conditions are not the same for the production of all acids. The present invention is not directed to new reaction conditions, although, in the case of some specific products, it is desirable to use somewhat different conditions than those which give best results with phthalic anhydride. It is an advantage of the present invention that the syntheses which have been carried out with phthalic anhydride may be carried out with phthalide with greater ease and without requiring especially delicate reaction control apart from the ordinary precautions which are a necessity in all Friedel-Crafts syntheses by reason of the nature of the reaction itself, that is to say the products must, of course, be anhydrous and the usual care in preventing undue temperature rise and the use of aluminum chloride of suitable purity should be followed.

Phthalide, being a low melting substance and readily soluble in most organic liquids, can in many cases be used with the polynuclear aryl compound with which it is to react without solvent where the compound is a liquid or melts at a sufficiently low temperature. However, many of the polynuclear aryl compounds are solids and at the low or moderate temperatures used in the Friedel-Crafts syntheses a solvent must be used. In general, any solvents which are suitable in Friedel-Crafts syntheses with phthalic anhydride can be used. Examples of solvents of general utility in the process of the present invention are carbon disulfide, tetrachlorethane, nitrobenzene, and other chlorinated aliphatic compounds which do not show such tendency to themselves react with the phthalide.

In the case of very active aryl compounds, solvents may be used which themselves react with phthalide in Friedel-Crafts syntheses but which have a much lower reaction speed. Thus, for example, where a very active polynuclear aryl compound is used, such solvents as benzene may be used. In general, the choice of solvent is very similar to that obtaining in the ordinary Friedel-Crafts syntheses with phthalic anhydrides, for while phthalide shows a greater reactivity and permits smoother and more satisfactory operation, it does not appear to show anomalies in its behavior toward inert or relatively inactive solvents despite the fact that its chemical nature is so radically different from that of phthalic anhydride. This is an added advantage of the present invention since it gives the chemist a wide choice of reaction media and the best conditions may be chosen for any particular synthesis. A few representative solvents have been referred to, and it should be understood that these are merely illustrations and that in general the solvents used in Friedel-Craft syntheses with phthalic anhydride are all applicable to the present process. Of course, mixtures of solvents are also suitable and are included within the scope of the present invention. Similarly, of course, the production of mixed compounds by the use of more than one aryl compound or more than one phthalide substance are included.

From the above general description of the invention, it will be apparent that it is concerned with the production of aralkylaryl carboxylic acids. It should be understood that the present invention does not cover the direct production of anthrone substances by fusion reactions of phthalide substances with polynuclear aromatic compounds which lead without isolation of the carboxylic acids direct to ring compounds of the anthrone type. These reactions form the subject matter of copending applications, and are not included in the scope of the present invention, which is limited to the production of the intermediate acids.

While the invention is directed broadly to the reaction of a phthalide substance with any polynuclear aromatic compound having a molecular weight greater than 128, it is particularly applicable to certain classes of compounds which form valuable acids. Thus, for instance, very valuable intermediate products are obtainable with substituted and with halogenated naphthalenes; particularly, alphachlornaphthalene produces an acid which after ring closure gives a very important chlorinated naphthanthrone usable in the production of many very fast vat dyes. Other substituted naphthalenes also give important intermediate products. The hydrogenated naphthalenes such as tetraline and decaline react with even greater readiness with phthalide and produce intermediate acids, the esters of which have valuable plasticizing properties, which esters, however, are not claimed per se in the present application.

A second class of products of great interest are the aralkylaryl acids obtainable from diphenyl and diphenyl oxide, and, particularly, the monohalogen substituted diphenyls and diphenyl oxides, for instance the reaction product of the 2- or 4-halogen diphenyl or diphenyl oxide. These halogen acids can be readily transformed into the corresponding amino compounds by the process of the copending application of A. O. Jaeger Serial No. 520,718 filed March 6, 1931 and form very valuable intermediates for the production of aminophenyl anthrones. Reaction products with substituted phthalides, for example halogen substituted phthalides, also present a very attractive field.

While usually phthalides unsubstituted in the oxymethyl group are employed, mono-substituted phthalides such as monophenyl phthalide may be used. The di-substituted phthalides in which both hydrogens of the oxymethyl group are substituted in general do not show a satisfactory reactivity. When the mono-substituted compounds are used triarylmethanes are obtained, many of which are of importance in the production of dyes.

*Example 1*

A mixture of phthalide and alphachlornaphthalene in molecular proportions, dissolved in sufficient carbon disulfide or tetrachlorethane to form a sufficiently fluid reaction mixture, is treated with aluminum chloride somewhat in excess of 1 mol. of aluminum chloride. The aluminum chloride, which should be anhydrous and of good quality, is added with vigorous stirring at from 15 to 20° C. The reaction mixture is gradually heated up to 40° C. over a period of about 1 hour, the stirring being maintained vigorously. After reaching 40° C. the mixture is held at this temperature for from 1½ to 2½ hours. Thereupon the temperature is raised to from 55-70° in order to complete the reaction. Care should be taken, however, that the temperature does not exceed 75° C. and that the stirring is uniformly vigorous. After the reaction is complete, which is usually indicated by the fact that hydrogen chloride is no longer given off, the batch is allowed to cool, with continued stirring, to room temperature, the aluminum base then being added slowly to 2,000 to 3,000 parts by weight of iced 10% sulfuric acid with vigorous agitation. A beautiful crystalline product is obtained with excellent yield.

Instead of phthalide, substituted phthalide such as chlor- or nitro-phthalide may be used. The corresponding substituted chlornaphthoyl benzoic acid is obtained.

*Example 2*

1 mol of phthalide and 1 mol of 2-chlorodiphenyl are mixed with aluminum chloride in a considerable amount of excess over molecular proportions and an amount of tetrachlorethane sufficient to give a readily stirrable solution at a temperature of about 20° C. and thoroughly agitated for about two hours or until the hydrogen chloride is no longer rapidly evolved. The reaction mixture is then heated up to from 40 to 75° C. until the evolution of hydrogen chloride is completed, the stirring being maintained continuously. The mixture is then cooled to room temperature and the acid separated as in Example 1.

Instead of using 2-chlorodiphenyl, 4-chlorodiphenyl may be used, and substituted phthalides may also be employed. The corresponding bromo compounds may likewise be produced, starting out from bromdiphenyls.

*Example 3*

1 mol of phthalide is mixed with 1 mol of diphenyl oxide and an amount of aluminum chloride equal to about 2½ times the weight of the phthalide is mixed in a carbon disulfide solution or nitrobenzene solutions at room temperature or, if desired, the solvent may be eliminated and the reagents caused to react in a ball mill. After evolution of hydrogen chloride has ceased, the reaction mixture is heated up to 40 to 75° C., care being taken in the case of volatile solvents that the temperature remains below the boiling point of the solvent or pressure is used. The heating is continued until the evolution of hydrogen chloride ceases, vigorous agitation being provided and maintained while the batch cools, whereupon the acid is isolated as described in Example 1.

Instead of using unsubstituted diphenyl oxide, halogen substituted diphenyl oxides, such as 2-chloro-, 4-chloro-, or the corresponding bromodiphenyl oxides may be used, and similarly substituted phthalides may be used in place of the unsubstituted phthalide.

*Example 4*

1 mol of phthalide and 1 mol of methyl naphthalene are mixed in carbon disulfide or tetrachlor ethane solution and an amount of aluminum chloride from 2 to 3 times the weight of the phthalide is added at a temperature from 15 to 20° C., vigorous agitation being provided and the temperature gradually raised to 45° C., at which temperature the mixture is maintained for about 2 to 2½ hours or until the evolution of hydrogen chloride has substantially ceased, whereupon the temperature may be raised to 65° C. and maintained at this temperature for several hours. After the reaction is complete, the batch is allowed to cool and the acid is isolated as described in Example 1.

Substituted phthalide may be used in place of unsubstituted phthalide, and other homologues of naphthalene may be used, the corresponding aralkylaryl carboxylic acids being obtained. In general, as the reaction proceeds more rapidly, the greater the molecular weight of the substituting alkyl group.

Example 5

To a molecular mixture of phthalide and tetraline, aluminum chloride is added in an amount equal to about 2¼ times the weight of phthalide, the temperature being maintained at about 18° C. during the addition of the aluminum chloride, which should take place gradually with vigorous agitation. After all of the aluminum chloride has been added, the temperature is raised to from 40 to 45° C. and is maintained at this temperature for about 1½ to 2 hours. Thereupon, the temperature is raised to from 55–65° C. and maintained until the reaction is complete and evolution of hydrogen chloride has ceased. Thereupon, the batch is cooled to room temperature and the acid isolated as described in Example 1. The tetrahydronaphthoyl benzoic acid obtained is very suitable for the production of esters which may be used as plasticizers.

In place of tetraline, other hydrogenated naphthalenes such as decaline may be used, the corresponding acids being obtained. When decaline is used instead of tetraline, the reaction time may be somewhat shortened as the reaction speed appears to be somewhat higher.

Example 6

A molecular mixture of acenaphthene and phthalide is dissolved in an inert solvent such as carbon disulfide and an amount of aluminum chloride equal to three times the weight of phthalide is added at 20° C. with vigorous agitation, the addition being gradual and cooling being provided if necessary to prevent the temperature from rising above 25° C. during the addition of the aluminum chloride. After all of the aluminum chloride has been added, the reaction is permitted to proceed for a short while at room temperature and then is heated gradually up to 45° C., the heating taking about an hour. After reaching 45° C., the reaction mixture is maintained at this temperature for about two hours and then the temprature is raised to from 60–65° C., suitable precautions being taken to prevent loss of solvent by vaporization. After the reaction is complete, the mixture is cooled to room temperature and the acid isolated as described in Example 1.

Instead of using acenaphthene, substituted acenaphthene such as halogen-substituted acenaphthene may be used, the corresponding substituted acids being obtained.

What is claimed as new is:

1. A process of preparing aralkylaryl carboxylic acids, which comprises bringing about reaction between a phthalide substance, a polynuclear aromatic compound having a molecular weight greater than 128, and aluminum chloride.

2. A process of preparing aralkylaryl carboxylic acids, which comprises bringing about reaction between a phthalide substance, a polynuclear aromatic compound having a molecular weight greater than 128 and aluminum chloride in the presence of a solvent showing a reaction speed with phthalide and aluminum chloride very much less than that of the polynuclear aromatic compound.

3. A process of preparing aralkylaryl carboxylic acids, which comprises bringing about reaction between a phthalide substance, a condensed polynuclear carbocyclic compound having a molecular weight greater than 128, and aluminum chloride.

4. A process of preparing aralkylaryl carboxylic acids, which comprises bringing about reaction between a phthalide substance, a condensed polynuclear carbocyclic compound having a molecular weight greater than 128 and aluminum chloride in the presence of a solvent showing a reaction speed with phthalide and aluminum chloride very much less than that of the polynuclear aromatic compound.

5. A process of preparing aralkylaryl carboxylic acids, which comprises bringing about reaction between a phthalide substance, an aromatic compound included within the group consisting of diaryls and diaryl oxides, and aluminum chloride.

6. A process of preparing aralkylaryl carboxylic acids, which comprises bringing about reaction between a phthalide substance, an aromatic compound included within the group consisting of diaryls, and diaryl oxides and aluminum chloride in the presence of a solvent showing a reaction speed with phthalide and aluminum chloride very much less than that of the polynuclear aromatic compound.

7. A process of preparing aralkylaryl carboxylic acids, which comprises bringing about reaction between a phthalide substance, a halogen-substituted naphthalene, and aluminum chloride.

8. A process of preparing aralkylaryl carboxylic acids, which comprises bringing about reaction between a phthalide substance, a halogen-substituted naphthalene and aluminum chloride in the presence of a solvent showing a reaction speed with phthalide and aluminum chloride very much less than that of the polynuclear aromatic compound.

9. A process of preparing aralkylaryl carboxylic acids, which comprises bringing about reaction between a phthalide substance, a hydrogenated naphthalene, and aluminum chloride.

10. A process of preparing aralkylaryl carboxylic acids, which comprises bringing about reaction between a phthalide substance, a hydrogenated naphthalene and aluminum chloride in the presence of a solvent showing a reaction speed with phthalide and aluminum chloride very much less than that of the polynuclear aromatic compound.

11. As a new chemical product, an aralkylaryl carboxylic acid having the formula $R-CH_2R^1-COOH$ where $R^1$ is a benzene nucleus and R is a nucleus included in the group consisting of diaryls having a molecular weight greater than 154 and diaryl oxides.

12. As a new chemical product, an aralkylaryl carboxylic acid having the formula $R-CH_2R^1-COOH$ where $R^1$ is a benzene nucleus and R is a nucleus included in the group consisting of diphenyls having a molecular weight greater than 142 and diphenyl oxides.

13. As a new chemical product, an aralkylaryl carboxylic acid having the formula $R-CH_2R^1-COOH$ where $R^1$ is a benzene nucleus and R is a nucleus included in the group consisting of halogen-substituted diphenyls and halogen-diphenyl oxides.

14. As a new compound, an aralkylaryl carboxylic acid having the formula R—CH$_2$R$^1$—COOH where R$^1$ is a benzene nucleus and R is a condensed polynuclear carboxylic group having a molecular weight greater than 128.

15. As a new compound, an aralkylaryl carboxylic acid having the formula R—CH$_2$R$^1$—COOH where R$^1$ is a benzene nucleus and R is a halogenated polynuclear aromatic group.

16. As a new compound, an aralkylaryl carboxylic acid having the formula R—CH$_2$R$^1$—COOH where R$^1$ is a benzene nucleus and R is a halogenated condensed polynuclear aromatic group.

17. As a new compound, an aralkylaryl carboxylic acid having the formula R—CH$_2$R$^1$—COOH where R$^1$ is a benzene nucleus and R is an alphachlornaphthyl group.

18. As a new compound, an aralkylaryl carboxylic acid having the formula R—CH$_2$R$^1$—COOH where R$^1$ is a benzene nucleus and R is a tetrahydronaphthyl group.

19. A product according to claim 13, in which R is a polynuclear group included in the group consisting of 2-halogen diphenyl, 4-halogen diphenyl.

ALPHONS O. JAEGER.
LLOYD C. DANIELS.